United States Patent
Yanaka et al.

(10) Patent No.: US 6,860,570 B2
(45) Date of Patent: Mar. 1, 2005

(54) VEHICULAR PARKING BRAKE APPARATUS AND CONTROL METHOD THEREOF

(75) Inventors: Akihiro Yanaka, Toyota (JP); Shoichi Shono, Nishikamo-gun (JP); Toshiaki Hamada, Okazaki (JP); Yoshikazu Tachiiri, Chiryu (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 222 days.

(21) Appl. No.: 09/927,386

(22) Filed: Aug. 13, 2001

(65) Prior Publication Data

US 2002/0027386 A1 Mar. 7, 2002

(30) Foreign Application Priority Data

Sep. 1, 2000 (JP) ........................................ 2000-265453

(51) Int. Cl.⁷ .............................................. B60T 13/68
(52) U.S. Cl. ...................... 303/20; 188/2 D; 188/106 P
(58) Field of Search ........................... 303/20; 188/2 D, 188/106 P

(56) References Cited

U.S. PATENT DOCUMENTS

| | | | | |
|---|---|---|---|---|
| 4,629,043 A | * | 12/1986 | Matsuo et al. ............... | 188/2 D |
| 5,139,315 A | * | 8/1992 | Walenty et al. ............... | 303/162 |
| 5,366,280 A | * | 11/1994 | Littlejohn ....................... | 303/3 |
| 5,590,744 A | * | 1/1997 | Belmond ...................... | 188/265 |
| 6,019,436 A | * | 2/2000 | Siepker ........................ | 303/13 |
| 6,213,259 B1 | * | 4/2001 | Hanson et al. .............. | 188/156 |
| 6,249,737 B1 | * | 6/2001 | Zipp ............................ | 303/155 |
| 6,311,808 B1 | * | 11/2001 | Halasy-Wimmer et al. .......................... | 188/72.6 |
| 6,447,074 B2 | * | 9/2002 | Engelhard ....................... | 303/3 |

FOREIGN PATENT DOCUMENTS

| | | |
|---|---|---|
| DE | 40 34 251 C2 | 4/1992 |
| DE | 41 29 919 A1 | 3/1993 |
| JP | U 5-44739 | 6/1993 |
| JP | A 5-139269 | 6/1993 |

* cited by examiner

Primary Examiner—Robert A. Siconolfi
(74) Attorney, Agent, or Firm—Oliff & Berridge, PLC

(57) ABSTRACT

A vehicular parking brake apparatus includes right and left-side brakes connected to an electric motor via a cable and an equalizer, so that the operating forces of the brakes become equal. In this case, the operating forces of the right and left brakes are commonly controlled based on one of the wheels that exhibits a greater rate of slip. Therefore, it is possible to avoid a rate of slip of the right and left wheels from becoming excessively great. The electric motor is controlled taking into account a transfer delay of the cable. Therefore, the slip rates of the right and left wheels can be quickly converged to a proper state. Thus, in a case where a parking brake is operated during the running of the vehicle, the operating force of the parking brake is controlled so that the state of slip of the wheels is a proper state.

18 Claims, 10 Drawing Sheets

| n | 1 | 2 | 3 | · · · |
|---|---|---|---|---|
| Duty RATIO | $D_1$ | $\alpha \cdot D_1$ | $\beta \cdot D_1$ | · · · |

$D_1 < 100\%$
$0 < \alpha, \beta < 1$
$\alpha > \beta$

VEHICULAR PARKING BRAKE APPARATUS AND CONTROL METHOD THEREOF

INCORPORATION BY REFERENCE

The disclosure of Japanese Patent Application No. 2000-265453 filed on Sep. 1, 2000, including the specification, drawings and abstract is incorporated herein by reference in its entirety.

BACKGROUND OF THE INVENTION

1. Field of Invention

The invention relates to a vehicular parking brake apparatus.

2. Description of Related Art

A vehicular parking brake apparatus is described in Japanese Utility Model Application Laid-Open No. HEI 5-44739. In the parking brake apparatus described in the laid-open application, a parking brake is operated in association with an operation of a service brake operating member if a servo device of a service brake apparatus has failed. Therefore, the short fall in the braking force on wheels can be reduced.

However, for example, if the vehicle is running on a low-friction road, a case may occur in which the braking force becomes excessively great compared with the friction coefficient of the road surface. Thus, the slip rate of a wheel may become excessively great.

SUMMARY OF THE INVENTION

The invention thus overcomes the aforementioned problems. Accordingly, the invention reduces or mitigates the drawbacks that can occur when a parking brake is operated during the running of the vehicle.

The invention provides for a vehicular parking brake apparatus which includes a right-side parking brake and a left-side parking brake that brakes a right-side wheel and a left-side wheel, respectively, of at least one group of a front wheel group and a rear wheel group of a vehicle, a drive power source that operates the right-side parking brake and the left-side parking brake, and a control unit that controls the drive power source. The control unit includes an antilock control portion that commonly controls an operating force of the right-side parking brake and an operating force of the left-side parking brake produced by driving the drive power source, based on a state of slip of a wheel of the right-side wheel and the left-side wheel that exhibits a greater change in a state of wheel rotation.

In a control method of a vehicular parking brake apparatus, the control is performed by obtaining a change in a state of rotation of a wheel of a right-side wheel and a left-side wheel; obtaining a state of slip of a wheel of the right-side wheel and the left-side wheel that exhibits a greater change in the state of rotation; and then commonly controlling an operating force of a right-side parking brake and an operating force of a left-side parking brake based on the state of slip of the wheel grasped.

According to the vehicular parking brake apparatus and the control method thereof described above, the antilock braking control is performed in the vehicular parking brake apparatus. Normally, the antilock control is performed during operation of a service brake. However, in this brake apparatus, the antilock control is performed during operation of a parking brake. The parking brake herein refers to a brake that is capable of maintaining an operated state even after the operating force applied by an operating person discontinues. In the case of a typical service brake, the brake force discontinues when the operating force applied by an operating person discontinues. In the case of the parking brake, however, the operated state is maintained. During operation of the parking brake, the antilock control as mentioned above is performed. During the antilock control, the drive power source that operates the right and left-side parking brakes is controlled based on the state of slip of one of the right-side wheel and the left-side wheel that exhibits a greater change in the state of the wheel rotation. The "greater change in the state of the wheel rotation" means, for example, a greater wheel deceleration, a greater amount of change in wheel speed within a predetermined time, a greater difference (amount of fall) obtained by subtracting the wheel speed from the vehicle body speed, etc. It is usually the case that an antilock control starting condition is met earlier with respect to the wheel that exhibits a greater change in the state of wheel rotation. If the difference between the wheel speed and the vehicle body speed is great, the quantity of slip indicating the state of slip of a wheel, such as the amount of slip, the rate of slip, etc., becomes great. If the antilock control starting condition is met with respect to the wheel of a greater change in the state of wheel rotation, the antilock control is commonly started for both the right-side wheel and the left-side wheel. In the invention, therefore, it is possible to favorably avoid an event in which the rate of slip of the right-side wheel or the left-side wheel becomes excessively great, in comparison with a case where the antilock control is performed based on the state of slip of a wheel that exhibits less change in the state of wheel rotation, a case where the antilock control is performed based on the state of slip of a predetermined wheel, etc.

In the vehicular parking brake apparatus described herein, the operating force of the right-side parking brake and the operating force of the left-side parking brake are commonly controlled. However, it is not altogether necessary that the right and left-side parking brakes have a common drive power source. Even a construction in which drive power sources are provided separately for the brakes is included within the invention provided that the drive power sources are commonly controlled.

BRIEF DESCRIPTION OF THE DRAWINGS

The above-mentioned and other objects, features, advantages, technical and industrial significance of this invention will be better understood by reading the following detailed description of the preferred embodiments of the invention, when considered in connection with the accompanying drawings, in which.

DETAILED DESCRIPTION OF PREFERRED EMBODIMENTS

In the following description and the accompanying drawings, the invention will be described in more detail with reference to exemplary embodiments.

A parking brake apparatus in accordance with an embodiment of the invention will be described hereinafter with reference to the accompanying drawings.

Figure 1:
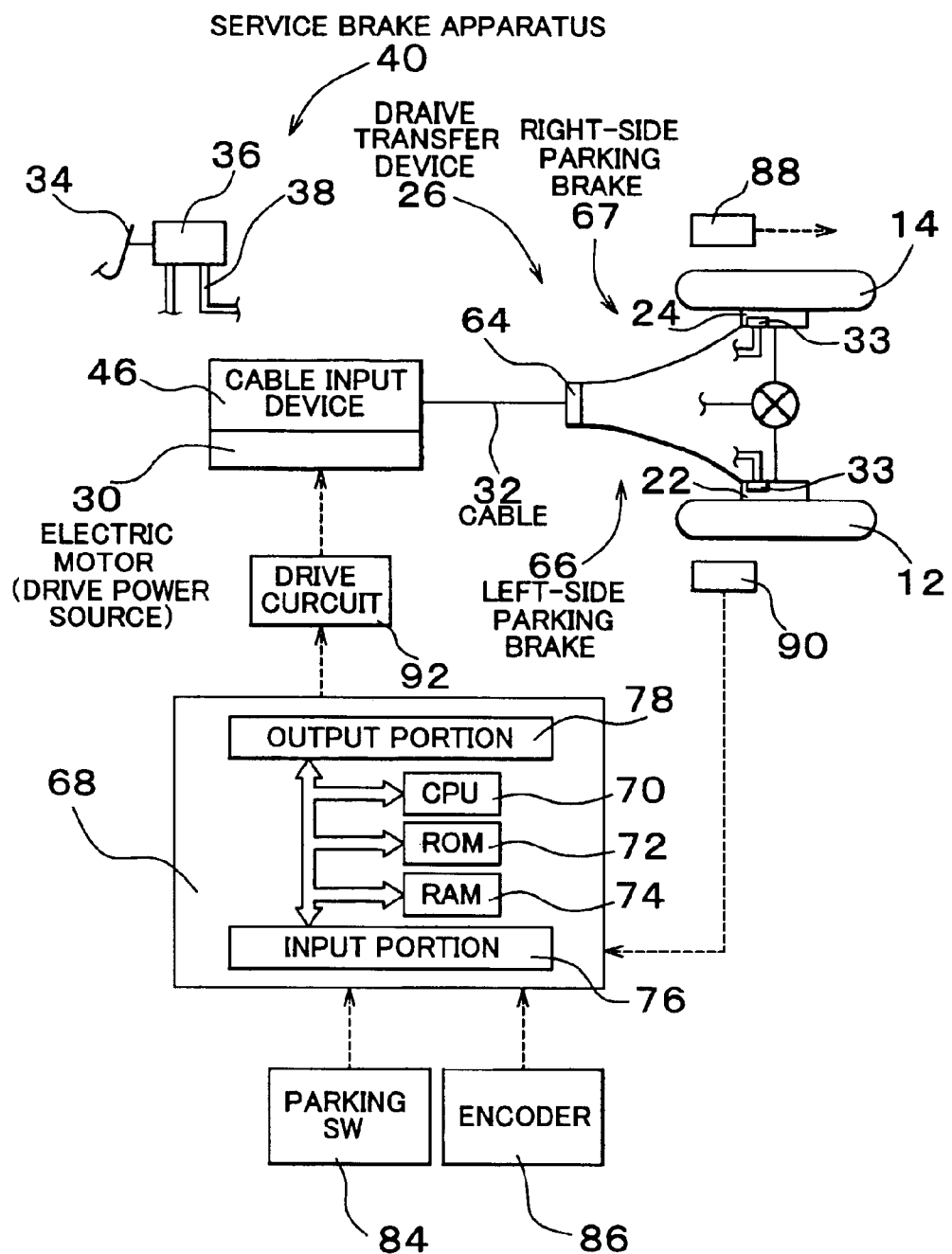
FIG. 1 is a diagram schematically illustrating an overall construction of a vehicular parking brake apparatus in accordance with an embodiment of the invention.
Figure 2:
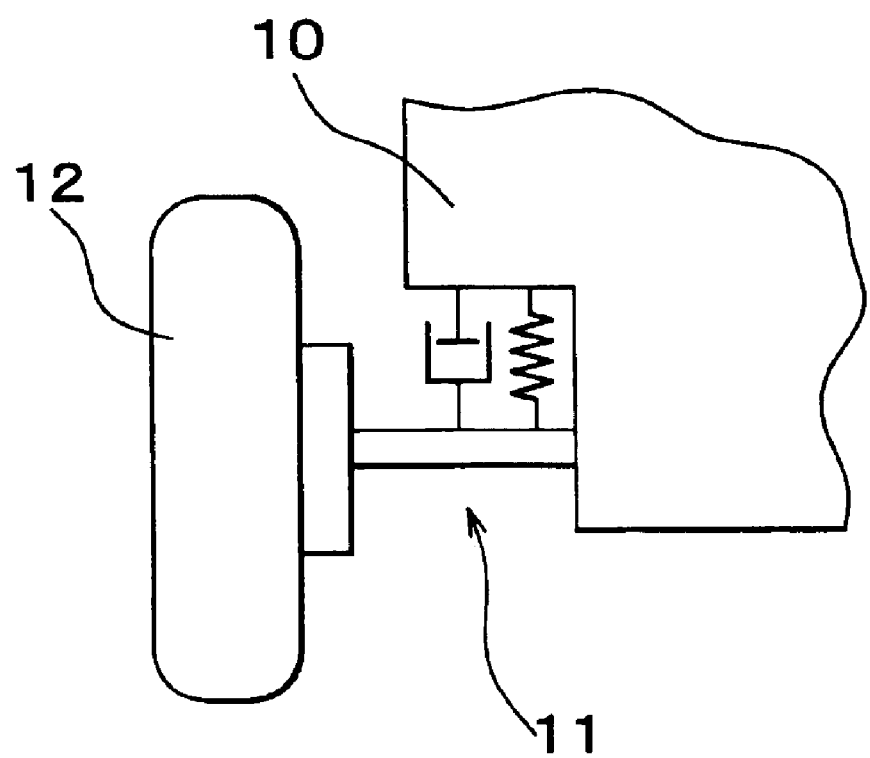
FIG. 2 is a diagram illustrating a relationship between the vehicular parking brake apparatus and a vehicle body.

Referring to FIGS. 1 and 2, wheels 12, 14 are connected to a vehicle body 10 via a suspension apparatus 11. The wheels 12, 14 in this embodiment are left and right rear wheels. The left and right rear wheels 12, 14 are provided with brakes 22, 24, respectively. The brakes 22, 24 are connected to a drive power source 30 via a drive transfer device 26, and are operated by driving the drive power source 30.

Each of the brakes 22, 24 includes, although not shown, a brake rotating body that is rotatable together with the wheel 12, 14, and a friction member that is retained by a non-rotatable member so that the friction member can be moved closer to and away from the brake rotating body. In each brake, the friction member is pressed against the brake rotating body by a drive power of the drive power source 30 transferred via the drive transfer device 26. In the brakes 22, 24, an operating force of a magnitude corresponding to the drive stroke and the drive power applied to the drive transfer device 26 by the drive power source 30 is produced.

In this embodiment, the brakes 22, 24 are drum brakes. The brake rotating member corresponds to a brake drum, and the friction member corresponds to a pair of shoes each having a lining. The drive transfer device 26 includes a cable 32. Due to the tension given to the cable 32 and the tension stroke, the two shoes are spread apart from each other, and are pressed against an inner peripheral surface of the brake drum. The cable 32 and joints and the like constitute a transfer member train. However, in other embodiments, each brake may be a disc brake.

The drum brakes 22, 24 each have a brake cylinder 33. The two shoes of each brake are expanded and are pressed against the inner peripheral surface of the brake drum by supplying a high-pressure operating liquid to the brake cylinder 33. In the embodiment, when an operating force is applied to a brake pedal 34 provided as a service brake operating member, by an operating person, a liquid pressure corresponding to the operating force is generated in a master cylinder 36. The operating liquid is supplied from the master cylinder 36 to the brake cylinders 33 via a liquid passage 38, and the drum brakes 22, 24 are thus operated. Then, the brakes 22, 24 produce an operating force of a magnitude corresponding to the liquid pressure on the brake cylinders 33. The brake cylinders 33, the brake pedal 34, the master cylinder 36, etc. form a service brake apparatus 40.

The service brake apparatus 40 may include a liquid pressure control valve device that is capable of controlling the liquid pressure on the brake cylinders 33. Furthermore, the service brake apparatus may include an electric motor, and an electric friction brake that is operated by driving the electric motor.

Figure 3:
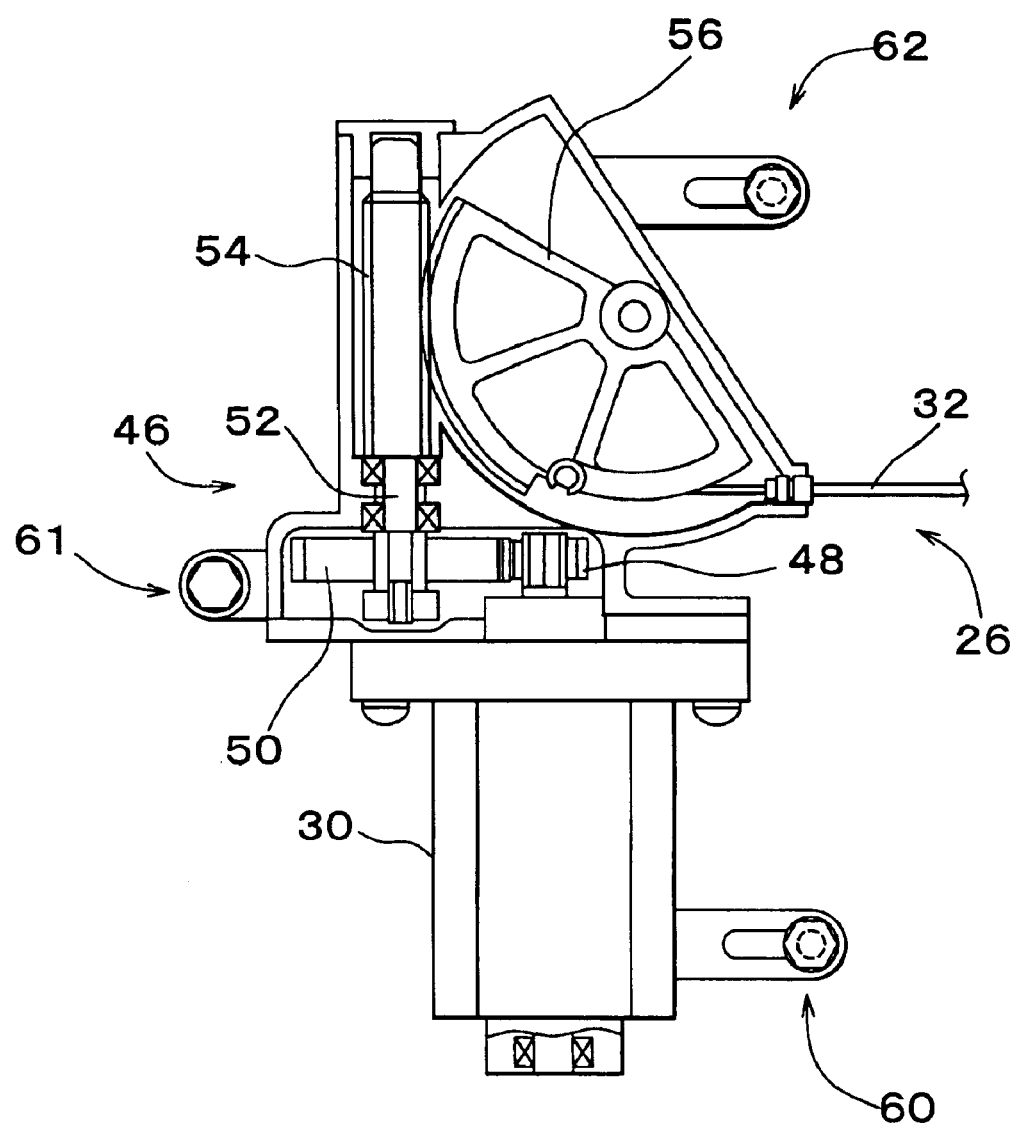
FIG. 3 is a diagram illustrating a drive power source and its surrounding portion in the vehicular parking brake apparatus.

The drive power source 30 is an electric motor as indicated in FIG. 3. The electric motor 30 is capable of turning in both a forward and a reverse directions.

The drive transfer device 26 includes the aforementioned cable 32, and a cable input device 46 for applying the drive power of the electric motor 30 to the cable 32. The cable input device 46 includes a first gear 48 that is rotatable integrally with an output shaft of the electric motor 30, a second gear 50 meshed with the first gear 48, a worm 54 that is rotated along with a rotation of a rotating shaft 52 that is rotatable together with the second gear 50, and a worm wheel 56 meshed with the worm 54 and engaged with the cable 32. The worm wheel 56 is rotated in either the forward or reverse direction by rotation of the electric motor 30, so that the cable 32 is pulled or loosened. If the electric motor 30 is set to a stopped state and the worm wheel 56 is set to a stopped state, the cable 32 is also kept in that state. That is, the brakes 22, 24 are kept in that state. Thus, the operating force on the brakes 22, 24 is maintained without electric current being supplied to the electric motor 30.

In FIG. 3, reference characters 60, 61, 62 represent mounting portions (not shown) of the electric motor 30 and the cable input device 46 with respect to a vehicle body-side member.

The cable input device 46 is a device that applies drive power from the electric motor 30 to the cable 32 but blocks transfer of force applied from the cable 32 to the electric motor 30. Therefore, the electric motor 30 is not turned by a force acting on the cable 32. The cable input device 46 may thus be considered a reverse transfer blocking device. If the turning of the electric motor 30 is stopped, the state of operation of the cable 32 at that time point can be maintained. Thus, the cable input device 46 may be considered as a hold device.

An equalizer 64 is provided along the cable 32 as shown in FIG. 1. The drive power applied from the electric motor 30 to the cable 32 via the cable input device 46 is equally transferred to the left and right brakes 22, 24.

In this embodiment, a portion that transfers the drive power of the electric motor 30 to the brake 22 of the drive power transfer apparatus 26, the brake 22 and the like constitute a left-side parking brake 66, and a portion that transfers the drive power of the electric motor 30 to the brake 24 of the drive transfer device 26, the brake 24 and the like constitute a right-side parking brake 67.

The parking brakes 66, 67 are controlled by a control unit 68. The control unit 68 is formed mainly by a computer that includes a CPU 70, a ROM 72, a RAM 74, an input portion 76, an output portion 78, etc. The input portion 76 is connected to a parking switch 84 that commands an operation of the parking brakes 66, 67, an encoder 86 that detects the rotational angle of the output shaft of the electric motor 30, wheel speed sensors 88, 90 that detect the rotating speeds of the wheels 12, 14, respectively, etc. The encoder 86 is provided for the electric motor 30. Based on the rotational angle detected by the encoder 86, the position of the cable 32 (e.g., the stroke of the brakes 22, 24 from a reference position assumed at the time of start of operation) is detected. The count value provided by the encoder 86 is increased when the electric motor 30 is turned in the forward direction, and is decreased when the electric motor 30 is turned in the reverse direction.

The output portion 78 is connected to the electric motor 30 via a drive circuit 92. The current supplied to the electric motor 30 is controlled via the drive circuit 92. In this embodiment, the revolution direction and the revolution speed of the electric motor 30 are controlled via the drive circuit 92. The revolution speed is controlled through a control of the duty ratio of the ON and OFF states of a switching device that is included in the drive circuit 92.

Figure 4:
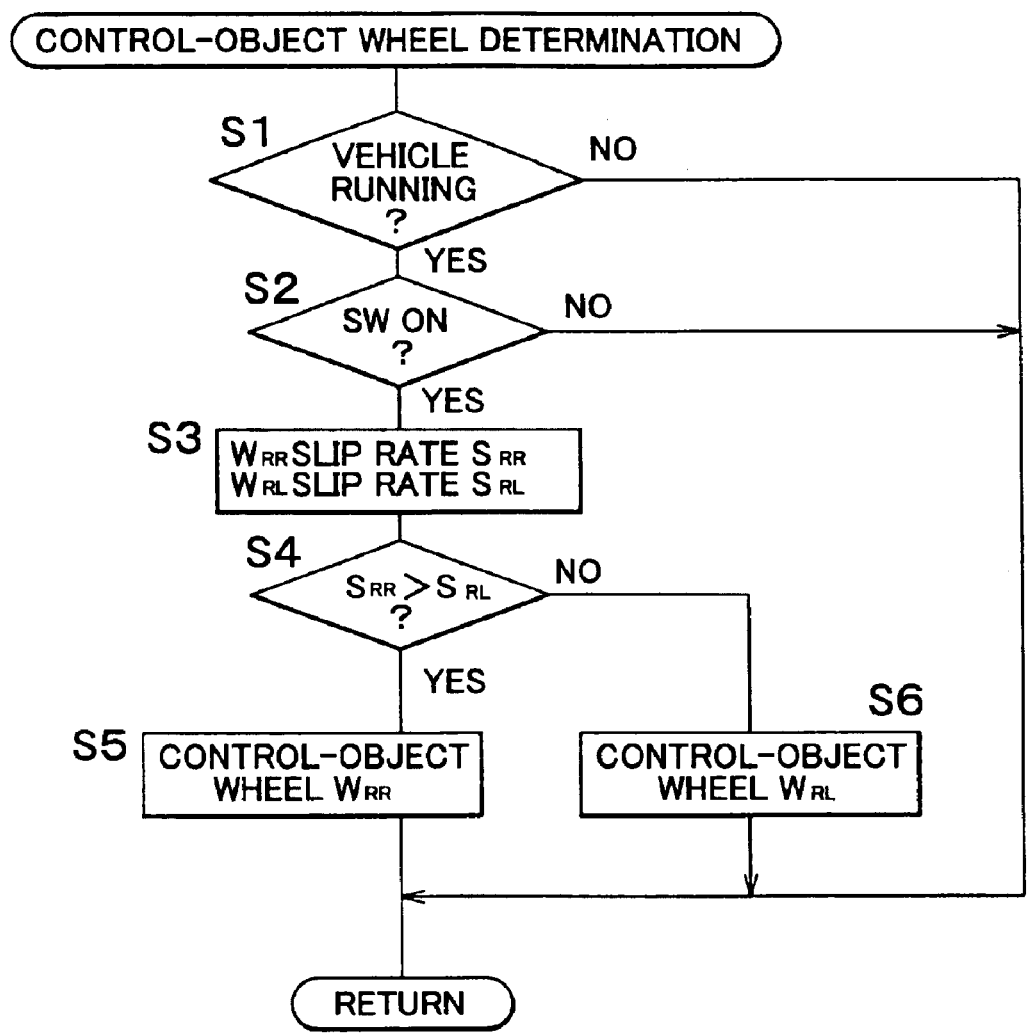
FIG. 4 is a flowchart illustrating a control-object wheel determining program stored in a ROM of a control unit of the vehicular parking brake apparatus.
Figure 5:
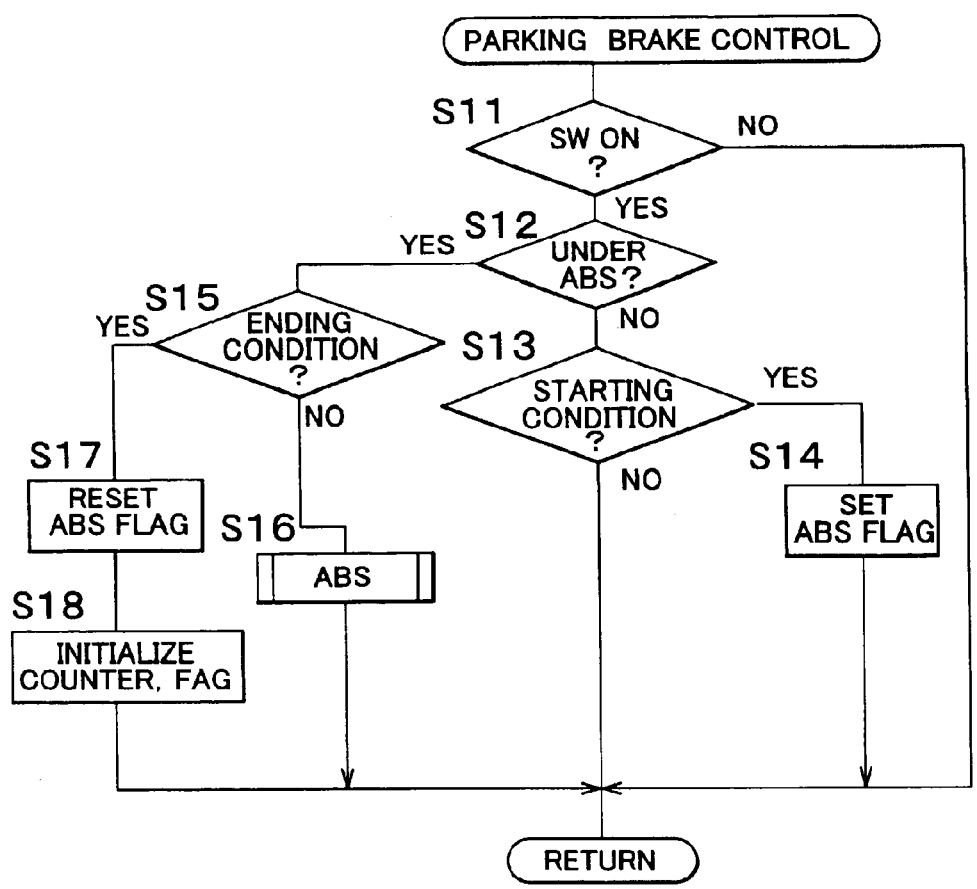
FIG. 5 is a flowchart illustrating a parking brake control program stored in the ROM of the control unit.
Figure 7:
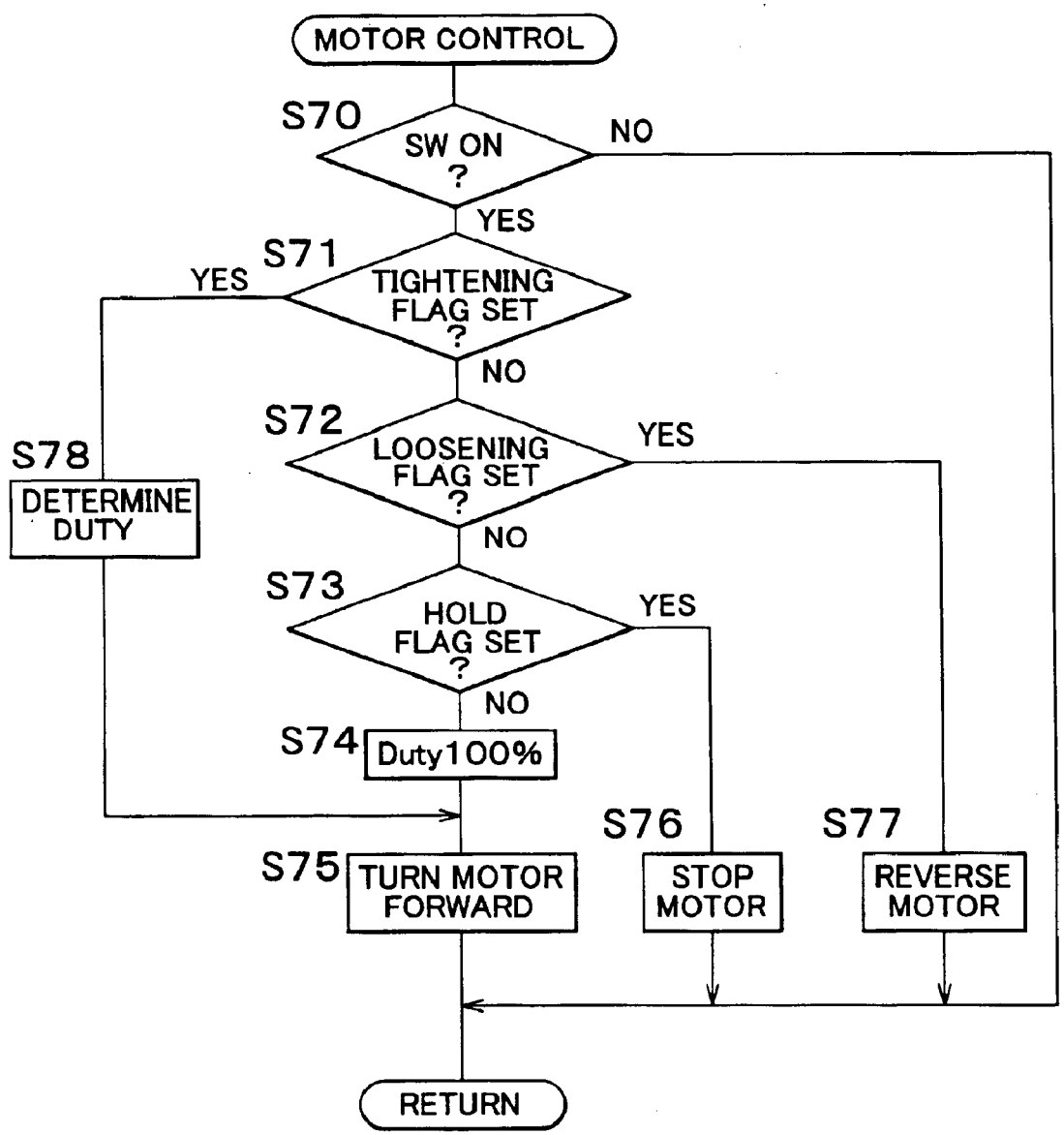
FIG. 7 is a flowchart illustrating a motor control program stored in the ROM of the control unit.
Figures 8, 9:
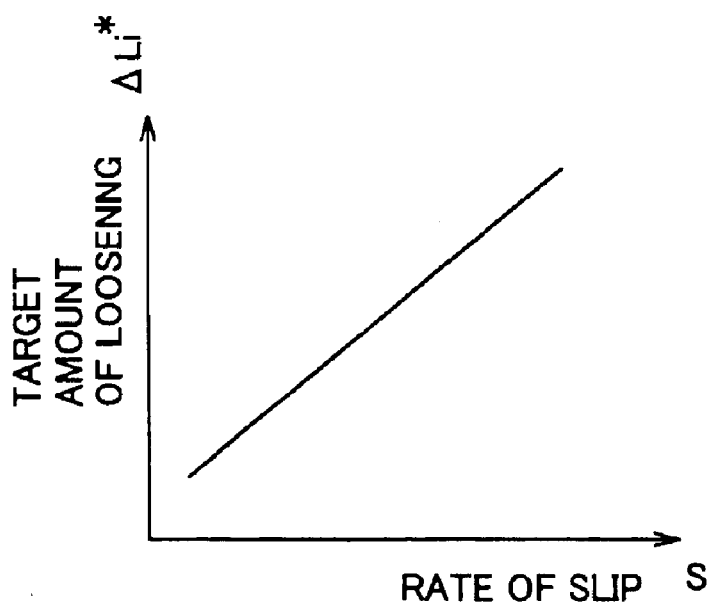
FIG. 8 is a map indicating a duty ratio determining table stored in the ROM of the control unit.
FIG. 9 is a map indicating a loosening amount determining table stored in the ROM of the control unit.

Stored in the ROM 72 are, for example, a parking brake control program illustrated by the flowchart of FIG. 5, a control-object wheel determining program illustrated by the flowchart of FIG. 4, an electric motor control program illustrated by the flowchart of FIG. 7, a duty ratio determining table as indicated by the map of FIG. 8, a loosened-time target stroke change amount determining table as indicated by the map of FIG. 9, etc.

When the parking switch 84 is operated, the electric motor 30 is operated in the forward direction. Thus, the cable 32 is pulled to actuate the brakes 22, 24. Since the equalizer 64 is provided along the cable 32, the drive power of the electric motor 30 is distributed equally to the left and right brakes 22, 24.

The parking switch 84 is a switch that is turned on when the vehicle is parked. However, in some cases, the parking switch 84 may be operated during the running of the vehicle. During the running of the vehicle, the parking brake is operated in, for example, a case where if a service brake apparatus has an abnormality, the parking brake is operated along with an operation of a service brake operating member, that is, the parking brake is operated as an auxiliary brake in addition to the service brake, similarly to a conventional vehicular parking brake apparatus. Furthermore, there are cases where the parking brake is operated instead of the service brake if the service brake apparatus has an abnormality. There are still other cases where the parking switch is operated without an operation of the service brake operating member during the running of the vehicle, that is, where the parking brake is operated without the service brake being operated during the running of the vehicle. In the brake apparatus of the embodiment, if the parking brake is operated as in any one of the aforementioned cases, an antilock braking control is performed.

If in the aforementioned case, equal drive powers are transferred to the left and right brakes 22, 24 (equal operating forces are generated in the brakes 22, 24), there is an apprehensions that, in one of the wheels 12, 14, the operating force may become excessively great with regard to the friction coefficient of the road surface, and the slipping state may become excessive. Therefore, in this embodiment, the electric motor 30 is controlled based on the state of slip of one of the wheels 12, 14 that exhibits a greater change in the state of rotation. A "greater change in the state of rotation" of a wheel means, for example, a greater wheel deceleration, a greater amount of change in the wheel speed within a predetermined time, a greater difference between the wheel speed and the vehicle body speed, etc. If the difference between the wheel speed and the vehicle body speed is great, the quantity of slip that indicates the state of slip of a wheel, such as the amount of slip, the rate of slip, etc., is great. In this embodiment, the electric motor 30 is controlled based on one of the left and right wheels 12, 14 that exhibits a greater change in the state of rotation, that is, a wheel that exhibits a greater rate of slip. That is, the control-object wheel is the wheel that exhibits a greater rate of slip. If an antilock control starting condition is met with respect to the control-object wheel, the antilock control is started with respect to both the left and right wheels 12, 14. After the antilock control is started, the brake operating force applied to the left and right wheels 12, 14 is controlled based on the state of slip of the control-object wheel.

In the flowchart shown in FIG. 4, in step 1 (hereinafter, simply referred to as "S1"; other steps will be similarly referred to), it is determined whether the vehicle is running. If the vehicle is running (S1: YES), the process proceeds to S2, in which it is determined whether the parking switch 84 is in an ON state. If the vehicle is not running (S1: NO), the process jumps to RETURN. If the parking switch 84 is in the ON state (S2: YES), the process proceeds to S3, in which the rates of slip of the wheels 12, 14 are determined. The rate of slip can be determined based on the wheel speed and the estimated vehicle body speed acquired based on the wheel speeds. If the parking switch 84 is not in the ON state (S2: NO), the process jumps to RETURN.

After the processing of S3, the process proceeds to S4 in which the rate of slip of the left rear wheel 12 and the rate of slip of the right rear wheel 14 are compared. That is, it is determined whether the rate of slip of the right rear wheel 14 is greater than the rate of slip of the left rear wheel 12. If the rate of slip of the right rear wheel 14 is greater (S4: YES), the process proceeds to S5 where the control-object wheel is set to the right rear wheel 14. If the rate of slip of the left rear wheel 12 is greater (S4: NO), the process proceeds to S6 where the control-object wheel is set to the left rear wheel 12. This program is usually operated at every predetermined set time. In some cases, the control-object wheel is changed during the antilock control.

The parking brake control program illustrated by the flowchart of FIG. 5 is executed at every predetermined set time. In S11, it is determined whether the parking switch 84 is in an ON state. In S12, it is determined whether an antilock flag is in a set state. If the parking switch 84 is in the ON state (S11: YES) and the antilock flag is in a reset state (S12: NO), the process proceeds to S13, in which it is determined whether an antilock control starting condition is met. If the starting condition is met (S13: YES), the antilock flag is set in S14. In this embodiment, the antilock control starting condition is met if the wheel deceleration of the control-object wheel becomes equal to or greater than a set speed and the rate of slip becomes equal to or greater than a set value (i.e., a lower threshold of a set range of the target rate of slip in this embodiment).

If the antilock flag is set (S12: YES), the process proceeds to S15 where it is determined whether an antilock control ending condition is met. When the processing of S15 is first executed, it is usually the case that the ending condition is not met (S15: NO), and the process proceeds to S16, in which the antilock braking control is performed. The antilock braking control is performed based on the state of slip of the control-object wheel. The antilock braking control will be described later. The antilock control ending condition is met, for example, if the rate of slip of the control-object wheel becomes equal to or less than a set value, or the vehicle speed becomes equal to or less than the set value.

If the antilock control ending condition is met (S15: YES), the antilock flag is reset in S17, and the flag, the counter and the like used in the antilock braking control are reset to initial values in S18.

In the antilock braking control, one of an increase mode of increasing the operating force of the brakes 22, 24, a decrease mode of decreasing the operating force and a hold mode of maintaining the operating force is set based on the rate of slip of the control-object wheel. In accordance with the set mode, the electric motor 30 is controlled through the control of the drive circuit 92. Thus, the rate of slip of each wheel 12, 14 is controlled to remain between an upper threshold and a lower threshold that are determined based on the target rate of slip.

In the increase mode, the electric motor 30 is turned in the forward direction, so that the cable 32 is pulled. The position of the cable 32 assumed at the time of start of operation of the brake is defined as a reference position. The stroke from the reference position in the pulling direction is defined as a positive stroke. The increase mode is also termed "tightening mode" of pulling the cable 32.

In the decrease mode, the electric motor 30 is turned in the reverse direction, so that the cable 32 is loosened. The stroke that occurs when the cable 32 is loosened is defined as a negative stroke. The decrease mode is also termed "loosening mode" of loosening the cable 32.

In the hold mode, the operation of the electric motor 30 is stopped, and the tension applied to the cable 32 is maintained.

In this embodiment, the tightening mode is set at the time point when the rate of slip of the control-object wheel changes from an increasing tendency to a decreasing tendency. Upon the setting of the tightening mode, the cable 32 is pulled in. Then, when the stroke of the cable 32 reaches a target value, the mode is switched to the hold mode.

The loosening mode is set if the rate of slip of the control-object wheel has an increasing tendency, and becomes greater than the upper threshold determined based on the target rate of slip. In the loosening mode, the cable 32 is loosened. When the stroke reaches a target value, the mode is switched to the hold mode.

The target value of the stroke may be represented by a value of a stroke from the reference position as mentioned above, or the amount of change in the position of the cable 32, that is, the amount of change in the stroke thereof, in each one of the tightening mode and the loosening mode. The amount of change in the stroke in the tightening mode may be termed "amount of pull-in". The amount of change in the stroke in the loosening mode may be termed "amount of loosening".

A target value L2* of the stroke in the tightening mode is set to a value that is smaller than the stroke L0 occurring at the time of the previous setting of the loosening mode, by a predetermined decrease amount ΔLn. The decrease amount ΔLn is a value that is increased with an increase in the number of times n of the tightening mode. The position (stroke) of the cable 32 at the end of the tightening mode is gradually decreased in this embodiment. The decrease amount ΔLn may also be, for example, a value expressed by (reference decrease amount ΔL0+k×n). The decrease amount ΔLn may also be a constant value.

A target value of the amount of loosening (amount of change in stroke) ΔL1* is determined based on the rate of slip of the control-object wheel, the number of times of changing of the set mode, etc. As indicated in FIG. 9, with increases in the rate of slip S of the control-object wheel, the amount of loosening is increased and the amount of decrease in the operating force is increased. The target value of stroke L1* in the loosening mode is (L0−AL1*).

Figure 6:
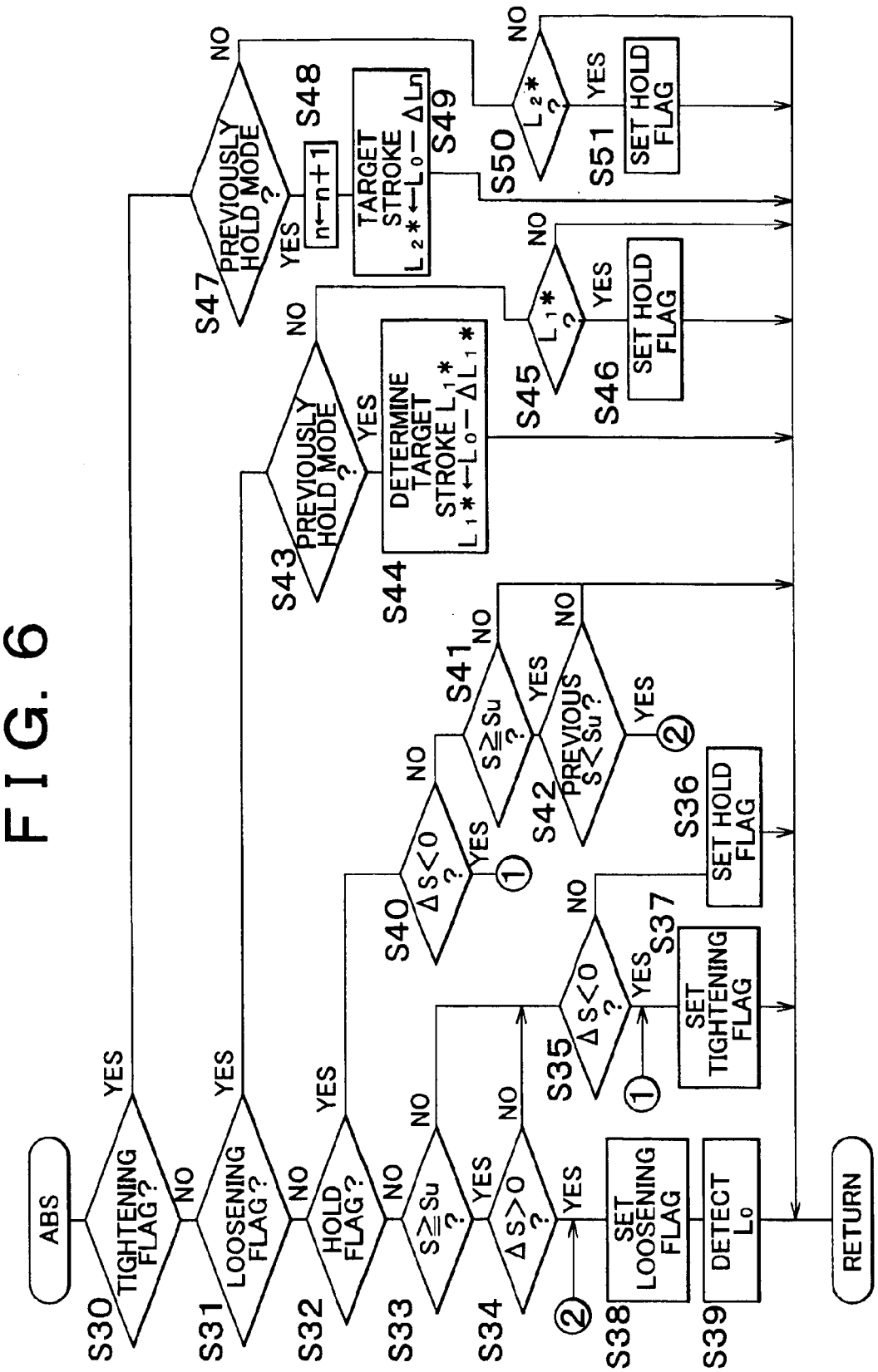
FIG. 6 is a flowchart illustrating a portion of the parking brake control program.

FIG. 6 is a flowchart illustrating a portion of the parking brake control program related to the setting of the tightening mode, the loosening mode and the hold mode. First, in S30, it is determined whether the tightening mode has been set (whether a tightening flag is in a set state). In S31, it is determined whether the loosening mode has been set (whether a loosening flag is in a set state). In S32, it is determined whether the hold mode has been set (whether a hold flag is in a set state). If none of the tightening mode, the loosening mode and the hold mode has been set, it is determined in S33 whether the rate of slip S of the control-object wheel is at least an upper threshold $S_U$. In S34, it is determined whether the rate of slip S has an increasing tendency.

If the rate of slip S is less than the upper threshold $S_U$ (S33: NO), or if the rate of slip S does not have an increasing tendency (ΔS≦0) (S34: NO), although the rate of slip S is greater than or equal to the upper threshold $S_U$, it is determined in S35 whether the rate of slip S has a decreasing tendency. If the rate of skip S does not have a decreasing tendency (S35: NO), the process proceeds to S36, in which the hold mode is set. When the antilock control has been started, the rate of slip S has an increasing tendency but is less than the upper threshold $S_U$, and therefore, the hold mode is set. That is, the hold flag is set. In this embodiment, based on the state of the flag, the electric motor 30 is controlled.

Conversely, if it is determined in S35 that the rate of slip S has a decreasing tendency (S35: YES), the process proceeds to S37, in which the tightening mode is set. That is, the tightening mode is set if the rate of slip S has a decreasing tendency, regardless of whether the rate of slip S is greater or smaller than the upper threshold $S_U$.

If the rate of slip S is greater than or equal to the upper threshold $S_U$ (S33: YES) and has an increasing tendency (S34: YES), the process proceeds to S38, in which the loosening mode is set. Subsequently in S39, the stroke (position) L0 of the cable 32 at that time is detected.

If the hold mode has been set (S32: YES), process proceeds to S40. In S40, it is determined whether the rate of slip S has a decreasing tendency. If the rate of slip S does not have a decreasing tendency (S40: NO), the process proceeds to S41, S42, in which it is determined whether the rate of slip S has exceeded the upper threshold S for the first time. If the rate of slip S has a decreasing tendency (S40: YES), the tightening mode is set. If the rate of slip S has exceeded the upper threshold $S_U$ for the first time (S41: YES), the process proceeds to S42. In S42, it is determined whether the previous rate of slip S is less than the upper threshold $S_U$. If the previous rate of slip S is less than the upper threshold (S42: YES), the loosening mode is set. Otherwise, the hold mode is set.

It is possible to conceive an arrangement in which when the tightening flag or the loosening flag is set, the hold flag is reset, or an arrangement in which a single flag is switched among a state indicating the tightening mode, a state indicating the loosening mode, and a state indicating the hold mode.

If the loosening mode has been set (S31:YES), the process proceeds to S43. In S43, it is determined whether the hold mode was previously set. If the loosening mode has been set for the first time (S43: YES), the previous mode was the hold mode. Then, the process proceeds to S44, in which a target stroke L1* is determined. In this embodiment, a target loosening amount ΔL1* is determined based on the rate of slip S of the control-object wheel in accordance with the table indicated in FIG. 9. A value obtained by subtracting the target loosening amount ΔL1* from the stroke L0 occurring at the time of detection in S37 is set as a target stroke L1* (L0−ΔL1*).

If S43 is executed the next time, the previous mode is not the hold mode (S43: NO). Subsequently in S45, it is determined whether the stroke of the cable 32 has reached the target stroke L1*. Until the target stroke L1* is reached, the loosening mode is continued. After the target stroke L1* is reached, the hold flag is set in S46.

If the tightening mode has been set (S30: YES), the process proceeds to S47, in which it is determined whether the previous mode was the hold mode. If the tightening mode has been set for the first time (S47: YES), the process proceeds to S48. Subsequently in S48, the number of times of the tightening mode is increased by "1". In S49, a target stroke L2* is set. In this embodiment, a position obtained by loosening, by an amount of ΔLn, the cable 32 from the stroke L0 occurring at the time point t3 at which the loosening mode was previously selected is determined as a target stroke L2* (L0–ΔLn).

If it is determined in S47 that the previous mode was not the hold mode (S43: NO), the process proceeds to S50, in which it is determined whether the target stroke L2* has been reached. If the target stroke L2* is reached (S50: YES), the hold mode is set in S51. Until the target stroke L2* is reached, the tightening mode is maintained. The electric motor 30 is controlled based on the state of the flag.

The motor control program illustrated by the flowchart of FIG. 7 is executed at every predetermined set time. In S70, it is determined whether the parking switch 84 is in the ON state. In S71 to S73, it is determined whether any one of the tightening flag, the loosening flag and the hold flag has been set. If none of the flags has been set, the process proceeds to S74, in which the duty ratio is set to, for example, 100%. Subsequently in S75, the electric motor 30 is controlled to operate in the forward direction. If the parking switch 84 is operated by an operating person while the vehicle is in a stopped state, the parking brake is operated in a normal manner.

If the hold flag is in the set state (S73: YES), the operation of the electric motor 30 is stopped in S76. If the loosening flag is in the set state (S72: YES), the electric motor 30 is controlled to operate in the reverse direction in S77. The duty ratio set in this case is a predetermined value. The duty ratio may be 100%, or may be a value less than 100%. If the tightening flag is in the set state, (S71: YES), the duty ratio is determined based on the number of times of the tightening mode in accordance with the table as shown in FIG. 8 in S78. Subsequently in S75, the electric motor 30 is controlled to turn in the forward direction in accordance with the duty ratio.

Figure 10:
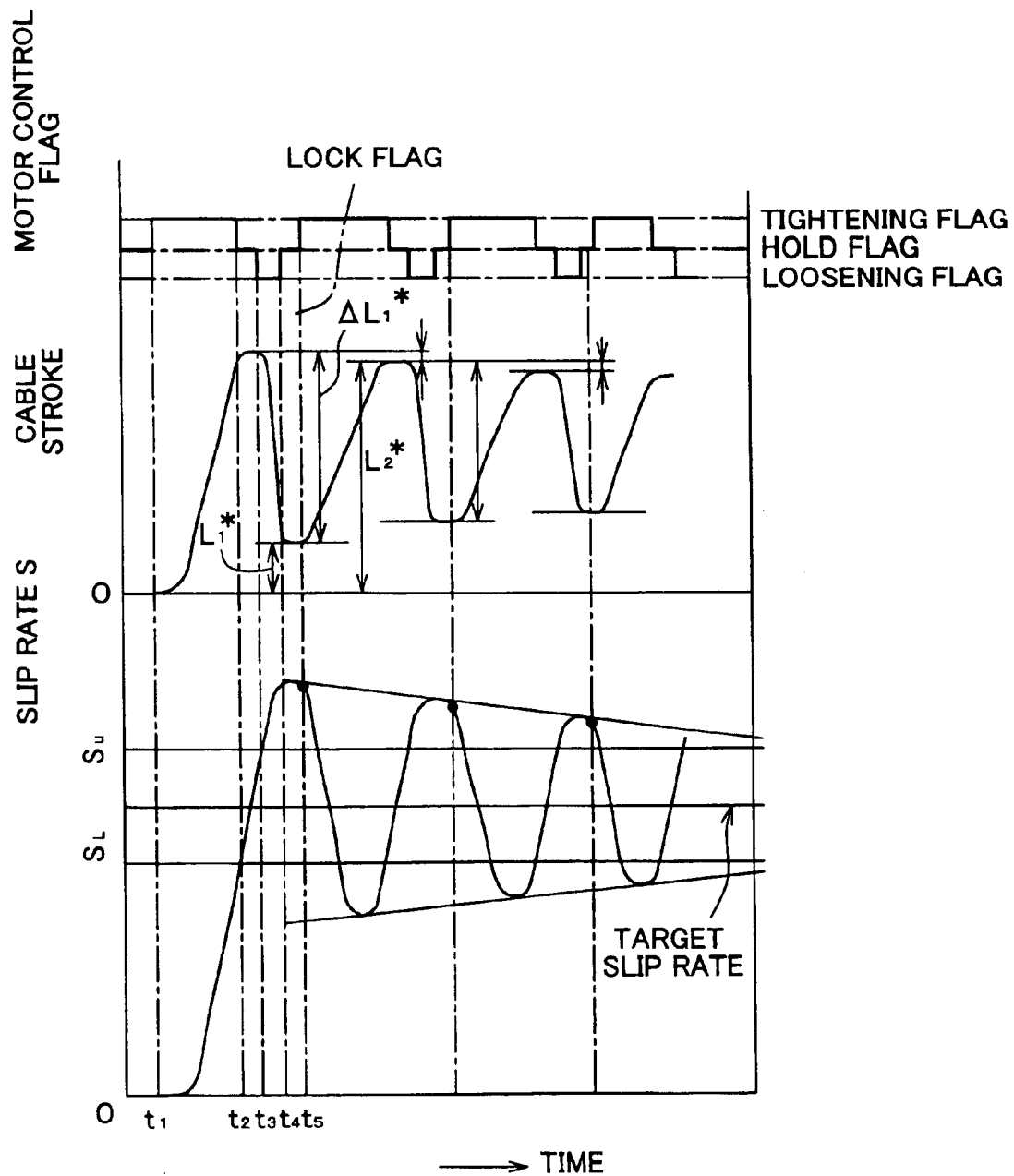
FIG. 10 is a diagram indicating an example of a control performed by the vehicular parking brake apparatus.

The state of change in the rate of slip S and the state of change in the stroke of the cable 32 that occur if the aforementioned control is performed will be described with reference to FIG. 10.

If at a time t1 the parking switch 84 is turned on, the electric motor 30 is turned in the forward direction with a duty ratio of 100%. The reason for setting the duty ratio to 100% in this case is that the cable 32 is usually loose at the time of start of operation of the brake, and that the duty ratio of 100% will reduce the delay in brake application in effect.

If at a time t2 the antilock control starting condition is met, the hold mode is set. If the hold mode is set, the rate of slip S does not immediately decrease, but continues to have an increasing tendency. If at a time t3 the rate of slip S exceeds the upper threshold $S_U$, the loosening mode is set. The loosening mode is maintained until the stroke of the cable 32 reaches the target stroke L1*. If at a time t4 the target stroke L1* is reached, the hold mode is set. At a time t5 when the rate of slip S switches from the increasing tendency to a decreasing tendency, the tightening mode is set. The tightening mode is maintained until the stroke reaches the target stroke L2*. When the target stroke L2* is reached, the mode is set to the hold mode.

It is also possible to adopt an arrangement in which if the rate of slip S reaches a lower threshold $S_L$, the hold mode is set.

After that, a control similar to that described above is repeatedly executed. Through this manner of control, the rate of slip S can be quickly converged into a predetermined target range. In a situation where the drive power of the electric motor 30 is transferred to the brakes 22, 24 via the cable 32, the drive power of the electric motor 30 is not immediately transferred to the brakes 22, 24, but is transferred with a delay. Therefore, through a control taking the delay into account, the overshoot of the rate of slip S can be reduced. The rate of slip S of the wheels 12, 14 can be quickly converged into the target range by an arrangement as in the embodiment in which the amount of tightening and the amount of loosening are reduced as the state of slip of a wheel becomes stable, or an arrangement in which the timing of setting the tightening mode is advanced to a timing at which the rate of slip S comes to have a decreasing tendency before the rate of slip S decreases to or below the upper threshold $S_U$, or an arrangement in which the speed of pulling in the cable 32 is reduced as the state of slip becomes stable, etc.

In the foregoing embodiment, the duty ratio at the time of the setting of the tightening mode is reduced with increases in the number of times of the tightening mode. However, it is also possible to adopt an arrangement in which the duty ratio is increased if the loosening mode is not set during the previous cycle, that is, if the tightening mode is followed by the hold mode and the mode is then set to the tightening mode without being set to the loosening mode. It is also possible to adopt an arrangement in which the target stroke in the loosening mode is set to an increased value if the rate of slip S does not decrease below the lower threshold $S_L$ during the tightening mode, that is, if while the rate of slip S is maintained at or above the lower threshold $S_L$, the hold mode is set, and then the loosening mode is set. With this arrangement, the rate of slip S will oscillate between the upper threshold $S_U$ and the lower threshold $S_L$.

Figure 11:
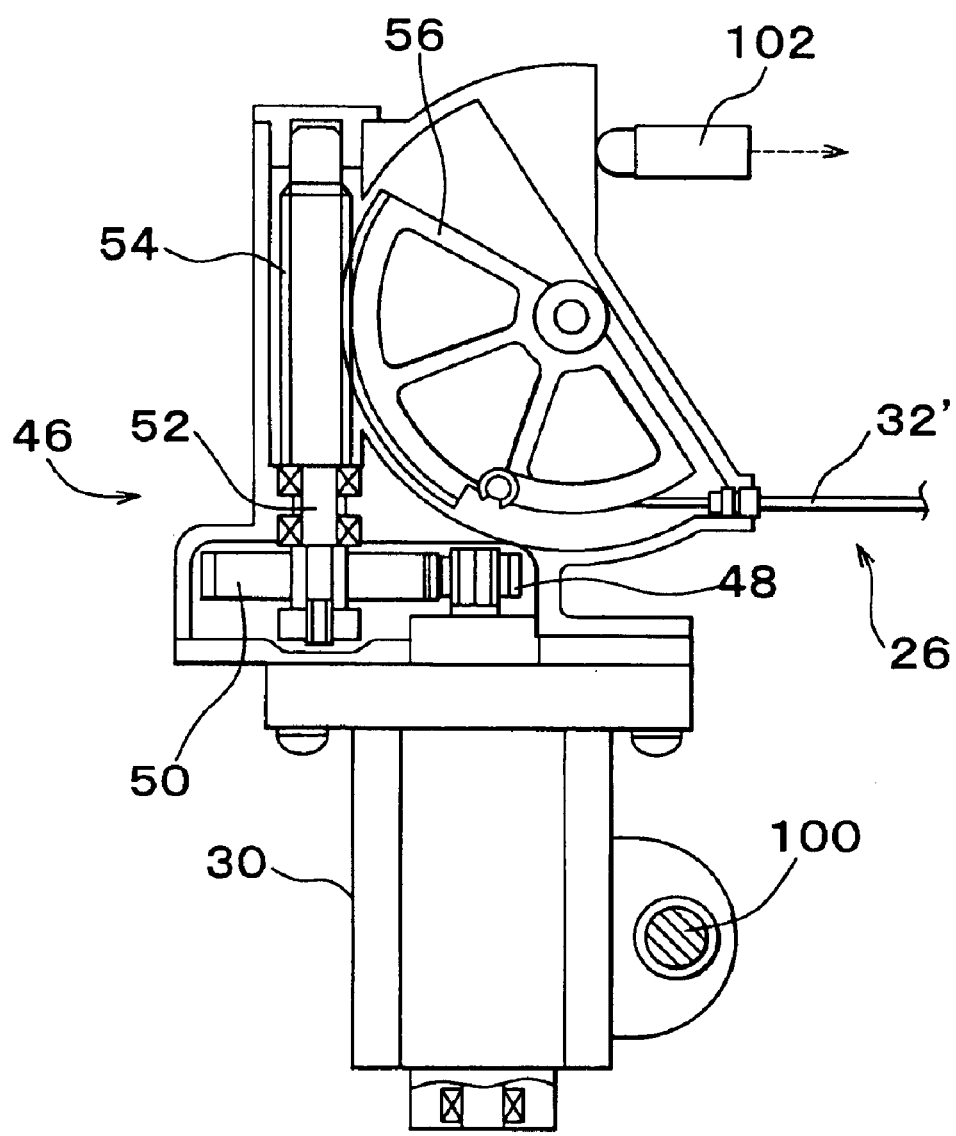
FIG. 11 is a diagram illustrating a drive power source and its surrounding portion included in a vehicular parking brake apparatus in accordance with another embodiment of the invention.

Furthermore, although in the foregoing embodiment, the electric motor 30 is controlled based on the stroke of the cable 32, the electric motor 30 may also be controlled based on the tensile force applied to the cable 32. The electric motor 30 may also be controlled based on both the stroke and the tensile force. In that case, the tensile force may be detected by adopting a construction as shown in FIG. 11 in which the entire unit of the drive power source 30 and the cable input device 46 is rotatably supported around a rotating shaft 100, and by detecting the force that acts to turn the entire unit of the electric motor 30 and the cable input device 46 around the rotating shaft 100, through the use of an operating force detecting device 102.

Still further, the drive transfer device 26 may be an apparatus that includes a connecting link 32' instead of the cable 32. In the antilock braking control, the duty ratio may be constant. The duty ratio may also be variable even in the tightening mode based on the number of times of the mode or the like.

According to the vehicular parking brake apparatus having constructions and functions as described above, the antilock braking control is started with regard to both the left rear wheel 12 and the right rear wheel 14 if the antilock control starting condition is met with regard to one of the wheels that exhibits a greater change in the state of wheel rotation. During the antilock braking control, the drive power source is controlled based on the state of slip of the wheel of a greater change in the state of wheel rotation. Since the operating forces of the left and right-side parking brakes 66, 67 are commonly controlled, the above-described parking brake apparatus is able to favorably avoid an event in which the rate of slip of the left rear wheel 12 or the right rear wheel 14 becomes excessively great, in comparison with an apparatus in which the antilock control is performed based on the state of slip of a wheel that exhibits less change in the state of wheel rotation, an apparatus in which the antilock control is performed based on the state of slip of a predetermined wheel, etc.

In the illustrated embodiment, the controller (the control unit 68) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicular parking brake apparatus, comprising:
   a right-side parking brake and a left-side parking brake that brake a right-side wheel and a left-side wheel, respectively, of at least one group of a front wheel group and a rear wheel group of a vehicle;
   a drive power source that operates the right-side parking brake and the left-side parking brake, wherein a transfer device mechanically transfers a drive power of the drive power source to the parking brakes, the transfer device including a transfer member train; and
   a controller that controls the drive power source, the controller including an antilock control portion that commonly controls an operating force of the transfer member train produced by driving the drive power source based on a state of slip of a wheel of the right-side wheel and the left-side wheel that exhibits a greater change in a state of wheel rotation, wherein the antilock control portion commonly controls the operating force of the transfer member train based on the state of slip of the wheel of the right-side wheel and the left-side wheel that exhibits a greater slip and the controller includes a stroke control portion that controls the operating force of the transfer member train so that a drive stroke approaches a target stroke determined based on the state of slip of the wheel.

2. The vehicular parking brake apparatus according to claim 1, wherein the drive power source commonly drives the right-side parking brake and the left-side parking brake, and the right-side parking brake and the left-side parking brake comprise:
   brakes that are provided for the right-side wheel and the left-side wheel, respectively; and
   the transfer device that connects the brakes to the drive power source and has an equalizer which distributes the operating force of the transfer member train equally to the brake of the right-side wheel and the brake of the left-side wheel.

3. The vehicular parking brake apparatus according to claim 2, wherein the antilock control portion comprises a common drive power source control portion that commonly controls the operating force of the transfer member train by controlling the common drive power source.

4. The vehicular parking brake apparatus according to claim 2, wherein the antilock control portion commonly controls the operating force of the transfer member tram based on the state of slip of the wheel of the right-side wheel and the left-side wheel that exhibits a greater slip.

5. The vehicular parking brake apparatus according to claim 1, wherein the antilock control portion commonly controls the operating force of the transfer member train based on the state of slip of the wheel of the right-side wheel and the left-side wheel that exhibits a greater slip.

6. A vehicular parking brake apparatus, comprising:
   a drive power source provided on a vehicle body of a vehicle;
   a parking brake including a brake provided on a wheel that is connected to the vehicle body via a suspension device, and a transfer device that mechanically transfers a drive power of the drive power source to the brake, the transfer device including a transfer member train; and
   a controller that controls an operating force of the parking brake by increasing/reducing the drive power of the drive power source while reducing an overshoot of a state of slip of the wheel corresponding to the parking brake, the controller including an antilock controller portion that commonly controls an operating force of the transfer member train, wherein the antilock control portion commonly controls the operating force of the transfer member train based on the state of slip of the wheel of a right-side wheel and a left-side wheel that exhibits a greater slip, and the controller includes a stroke control portion that controls the operating force of the transfer member train so that a drive stroke approaches a target stroke determined based on the state of slip of the wheel.

7. A vehicular parking brake apparatus, comprising:
   a drive power source;
   a parking brake that is operated by driving the drive power source, wherein a transfer device mechanically transfers a drive power of the drive power source to the parking brake, the transfer device including a transfer member train; and a parking brake controller that controls an operating force of the parking brake by switching the drive power source at least between an increase state in which the drive power source is operated so that the operating force of the parking brake is increased, and a decrease state in which the drive power source is operated so that the operating forces of the parking brake is decreased, based on a state of slip of a wheel corresponding to the parking brake, the controller including an antilock control portion that commonly controls an operating force of the transfer member train, wherein the antilock control portion commonly controls the operating force of the transfer member train based on the state of slip of the wheel of a right-side wheel and a left-side wheel that exhibits a greater slip, and the controller includes a stroke control portion that controls the operating force of the transfer member train so that a drive stroke approaches a target stroke determined based on the state of slip of the wheel.

8. The vehicular parking brake apparatus according to claim 7, wherein the parking brake controller has a hold state in which the drive power source is operated so that the drive stroke of the transfer member train is maintained, and the parking brake controller sets the hold state at a time of switching between the increase state and the decrease state.

9. The vehicular parking brake apparatus according to claim 8, wherein the parking brake controller sets the drive power source to the decrease state if the state of slip of the wheel exceeds a predetermined upper threshold.

10. The vehicular parking brake apparatus according to claim 9, wherein the parking brake controller sets the drive power source to the increase state at a time point when the state of slip of the wheel starts to decrease from a peak value.

11. The vehicular parking brake apparatus according to claim 8, wherein the parking brake controller sets the drive power source to the increase state at a time point when the state of slip of the wheel starts to decrease from a peak value.

12. The vehicular parking brake apparatus according to claim 7, wherein the parking brake controller sets the drive power source to the decrease state if the state of slip of the wheel exceeds a predetermined upper threshold.

13. The vehicular parking brake apparatus according to claim 12, wherein the parking brake controller sets the drive power source to the increase state at a time point the state of slip of the wheel starts to decrease from a peak value.

14. The vehicular parking brake apparatus according to claim 7, wherein the parking brake controller sets the drive power source to the increase state at a time point when the state of slip of the wheel starts to decrease from a peak value.

15. A control method of a vehicular parking brake apparatus, comprising:

determining a change in a state of rotation of one of a right-side wheel and a left-side wheel;

determining a state of slip of one of the right-side wheel and the left-side wheel that exhibits a greater change in the state of rotation; and commonly controlling an operating force of a right-side parking brake and an operating force of a left-side parking brake based on the determined state of slip, wherein an operating force of a transfer member train is commonly controlled based on the state of slip of the wheel of the right-side wheel and the left-side wheel that exhibits a greater slip, and the operating force of the transfer member train is controlled so that a drive stroke approaches a target stroke determined based on the state of slip of the wheel.

16. A control method of a vehicular parking brake apparatus, comprising:

determining a state of slip of a wheel corresponding to a parking brake;

increasing/decreasing a drive power of a drive power source that operates the parking brake while reducing an overshoot of the state of slip; and controlling an operating force of the parking brake by increasing/decreasing the drive power, wherein an operating force of a transfer member train is commonly controlled based on the state of slip of the wheel of a right-side wheel and a left-side wheel that exhibits a greater slip and the operating force of the transfer member train is controlled so that a drive stroke approaches a target stroke determined based on the state of slip of the wheel.

17. A control method of a vehicular parking brake apparatus, comprising:

determining a state of slip of a wheel corresponding to a parking brake;

operating a drive power source that operates the parking brake, to increase an operating force of the parking brake, based on the state of slip;

operating the drive power source to decrease the operating force of the parking brake if the state of slip exceeds a predetermined upper threshold; and operating the drive power source to increase an operating force of the parking brake at a time point when the state of slip of the wheel starts to decrease from a peak value, wherein an operating force of a transfer member train is commonly controlled based on the state of slip of the wheel of a right-side wheel and a left-side wheel that exhibits a greater slip and the operating force of the transfer member train is controlled so that a drive stroke approaches a target stroke determined based on the state of slip of the wheel.

18. The control method according to claim 17, wherein the drive power source is operated to keep the operating force of the parking brake at a constant value at a time when the operating force of the parking brake is switched from an increased state to a decreased state, and at a time when the operating force of the parking brake is switched from the decreased state to the increased state.

* * * * *